(12) United States Patent
Nakamura

(10) Patent No.: US 8,723,510 B2
(45) Date of Patent: May 13, 2014

(54) RESOLVER

(75) Inventor: Takehide Nakamura, Handa (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 616 days.

(21) Appl. No.: 12/659,410

(22) Filed: Mar. 8, 2010

(65) Prior Publication Data

US 2010/0244816 A1    Sep. 30, 2010

(30) Foreign Application Priority Data

Mar. 31, 2009   (JP) .................................. 2009-086278

(51) Int. Cl.
    *G01B 7/14*   (2006.01)
(52) U.S. Cl.
    USPC .................................. 324/207.17; 324/207.15
(58) Field of Classification Search
    USPC ........................................ 324/207.15, 207.17
    See application file for complete search history.

(56) References Cited

U.S. PATENT DOCUMENTS

| | | | |
|---|---|---|---|
| 4,223,300 | A | 9/1980 | Wiklund |
| 4,991,301 | A | 2/1991 | Hore |
| 5,239,288 | A | 8/1993 | Tsals |
| 5,521,494 | A | 5/1996 | Hore et al. |

FOREIGN PATENT DOCUMENTS

| | | |
|---|---|---|
| DE | 19 02 247 A1 | 8/1970 |
| DE | 28 06 660 C2 | 8/1978 |
| DE | 38 80 829 T2 | 1/1994 |
| DE | 692 21 483 T2 | 1/1998 |
| GB | 840099 | 7/1960 |
| JP | A-3-227002 | 10/1991 |
| JP | A-8-136211 | 5/1996 |
| JP | A-8-292066 | 11/1996 |
| JP | A-9-170934 | 6/1997 |

OTHER PUBLICATIONS

German Office Action issued in Application No. 10 2010 013 257.8-52; Dated Jun. 16, 2011 (With Translation).
Sep. 11, 2012 Office Action issued in Japanese Patent Application No. 2009-086278 (with translation).

*Primary Examiner* — Reena Aurora
(74) *Attorney, Agent, or Firm* — Oliff PLC

(57) ABSTRACT

A resolver comprises a first coil layer and a second coil layer each formed on a flat plate and an insulating layer formed between the first coil layer and the second coil layer. A SIN signal excitation coil includes a SIN first coil formed in the first coil layer and a SIN second coil formed in the second coil layer. A COS signal excitation coil includes a COS first coil formed in the first coil layer and a COS second coil formed in the second coil layer.

8 Claims, 15 Drawing Sheets

X: SIN COIL OUTPUT
Y: COS COIL OUTPUT
Z: BASE PLATE THICKNESS

RESOLVER

CROSS-REFERENCE TO RELATED APPLICATIONS

This application is based upon and claims the benefit of priority from the prior Japanese Patent Application No. 2009-086278 filed on Mar. 31, 2009, the entire contents of which are incorporated herein by reference.

TECHNICAL FIELD

The present invention relates to a resolver to be used for detecting rotation angle of an output shaft of a vehicle motor and others.

BACKGROUND ART

As for a hybrid electric vehicle and an electric vehicle, a high-power brushless motor is used and furthermore a higher power motor will be expected. To control the brushless motor of a hybrid electric vehicle, it is necessary to accurately ascertain the rotation angle of an output shaft of the motor. This is because the rotation position (angle) of a rotor needs to be correctly ascertained in order to control switching of energization of coils of a stator.

Accordingly, the motor preferably includes a resolver to accurately detect the angle. Such resolver used in a drive mechanism of a vehicle is required to provide high accuracy in addition to environment resistance because of the high number of revolutions of the drive mechanism. As with other in-vehicle components, the resolver is also demanded to achieve size reduction and cost reduction.

Patent Literature 1 discloses a sheet coil in which a A-phase detection coil is placed on a surface of an insulating sheet layer and a B-phase detection coil is placed on the other surface of the same. Herein, the A-phase detection coil and the B-phase detection coil are shifted 90° in phase from each other. An excitation coil is also formed as a sheet coil. The excitation coil and the detection coil are spaced to face each other with a predetermined gap therebetween.

Patent Literature 2 discloses a resolver as shown in FIG. 18 in which excitation coils are formed on a front surface (facing a stator-side base plate) and a back surface of a rotor-side base plate, a SIN (sine) coil is formed on a front surface (facing the rotor-side base plate) of the stator-side base plate, and a COS (cosine) coil is formed on a back surface of the same.

CITATION LIST

Patent Literature

Patent Literature 1: JP8 (1996)-292066 A
Patent Literature 2: JP8 (1996)-136211 A

SUMMARY OF INVENTION

Technical Problem

However, Patent Literatures 1 and 2 have the following problems. Specifically, in a first state as shown in FIG. 18, the distance between the excitation coil (formed on the front surface of the rotor-side base plate) and the SIN coil is 0.5 mm and the distance between the excitation coil and the COS coil is 1.0 mm. For adjusting output amplitudes of the COS coil and the SIN coil generated according to the thickness of the base plate, gain in the output amplitude is controlled.

However, since the vehicle motor has a large size, its dimension in an axial direction is therefore likely to greatly change due to thermal expansion and backlash of bearings. For instance, a second state where the above distance is changed by 0.25 mm in the axial direction is shown in FIG. 19. In FIG. 19, the distance between the excitation coil and the SIN coil is 0.75 mm and the distance between the excitation coil and the COS coil is 1.25 mm.

In this case, as shown in FIG. 17, the output of the SIN coil changes from 0.71 V (the case shown in FIG. 18) to 0.63 V (the case shown in FIG. 19). The output of the SIN coil also changes from 0.57 V (the case shown in FIG. 18) to 0.53 V (the case shown in FIG. 19).

In this case, the gain of the COS coil is set to 0.71/0.57=1.25 in the case shown in FIG. 18. This is different from the gain 0.63/0.53=1.19 in the case shown in FIG. 19. Thus an angle detection error may occur. Such disadvantage is apt to be problematic for an output shaft of the vehicle motor requiring high precision detection.

The present invention has been made in view of the circumstances to solve the above problems and has a purpose to provide a resolver capable of maintaining high detection accuracy even when a gap or clearance between an excitation coil and a detection coil changes.

Solution to Problem

To achieve the above purpose, a resolver of the invention provides a resolver having a SIN coil and a COS coil each formed on a flat plate, comprising: a first coil layer and a second coil layer each formed on the flat plate; and an insulating layer formed between the first coil layer and the second coil layer; the SIN coil including a SIN first coil formed in the first coil layer and a SIN second coil formed in the second coil layer, and the COS coil including a COS first coil formed in the first coil layer and a COS second coil formed in the second coil layer.

Advantageous Effects of Invention

According to the resolver having the above configuration according to the present invention, a SIN coil and a COS coil can be continuously held in a predetermined positional relation even when a gap or clearance between an excitation coil and a detection coil changes. Thus, no detection error occurs.

DESCRIPTION OF EMBODIMENTS

Figure 16:
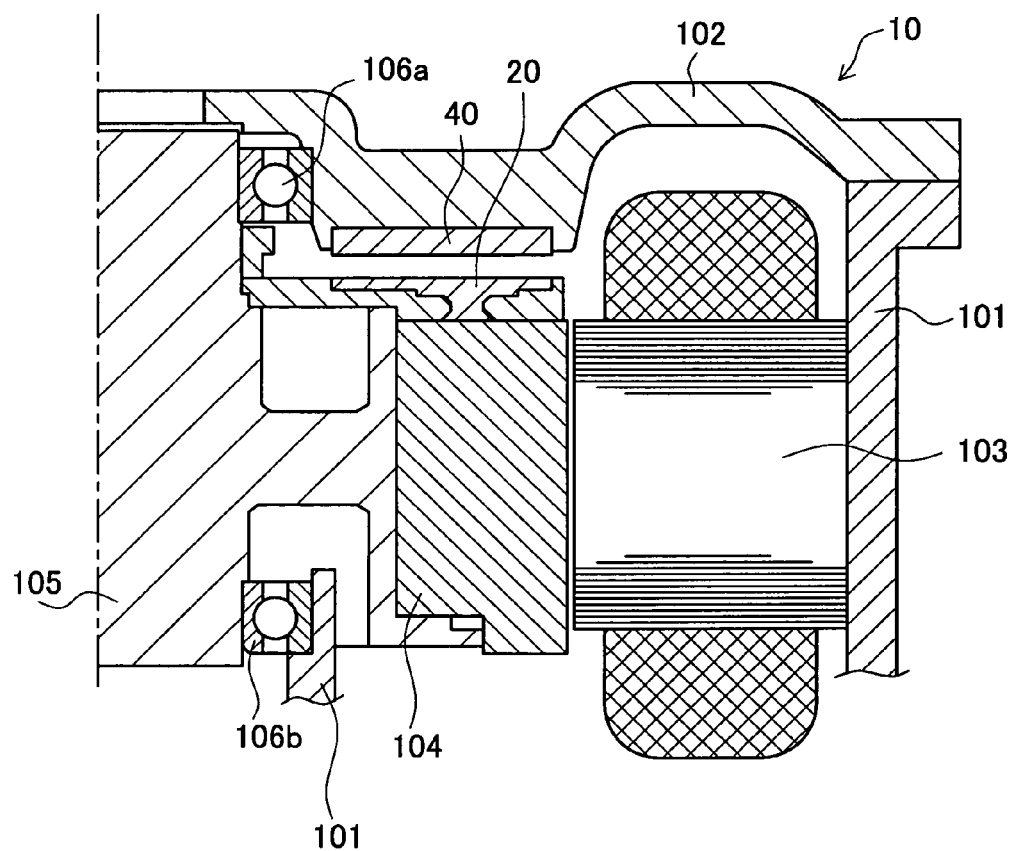
FIG. 16 is a sectional view roughly showing a structure of a motor in the embodiment.
Figure 17:
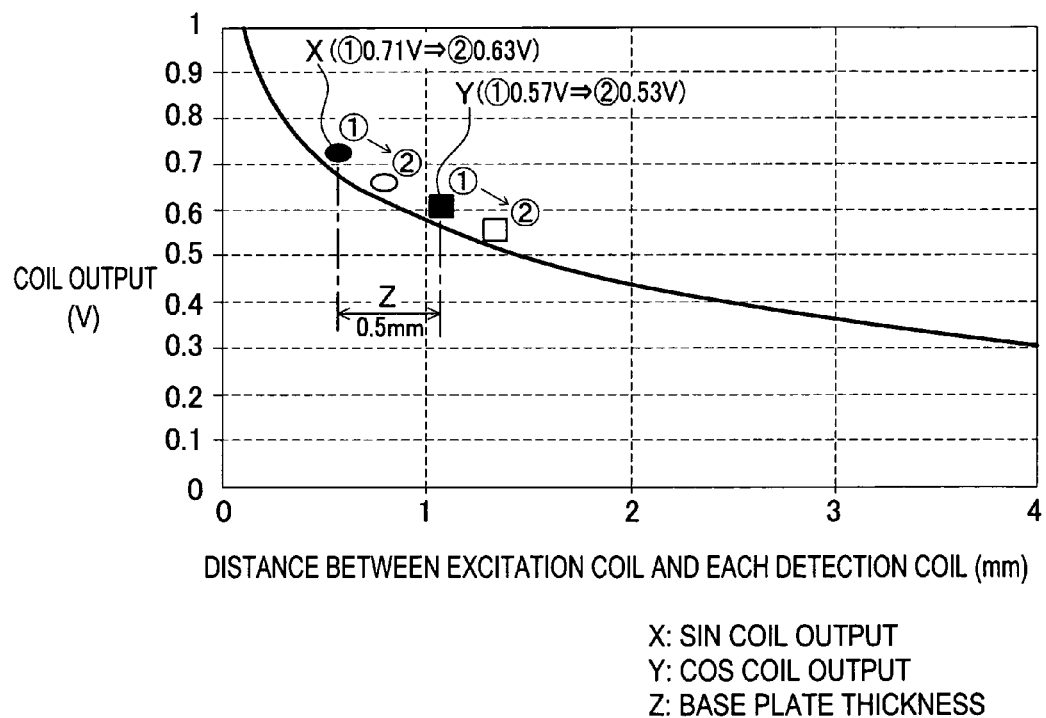
FIG. 17 is a view showing a structure of a conventional resolver.
Figure 18:
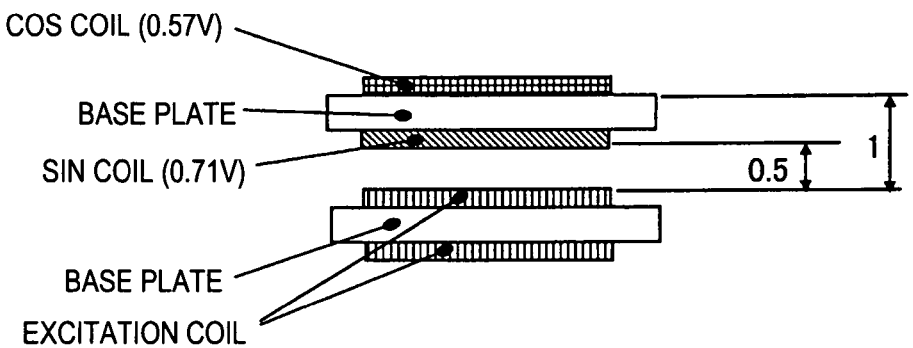
FIG. 18 is an explanatory view of the conventional resolver.
Figure 19:
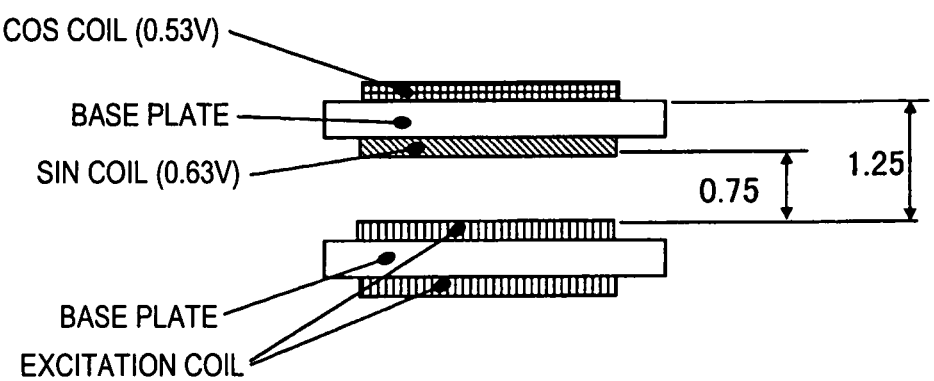
FIG. 19 is a data diagram of the conventional resolver.

A detailed description of a first preferred embodiment of the present invention will now be given referring to the accompanying drawings. FIG. 16 is a sectional view roughly showing the structure of a motor in the first embodiment.

A motor 10 is a brushless motor including a case main body 101, a case cover 102, a motor stator 103, a motor rotor 104, a motor shaft 105, and motor bearings 106a and 106b.

The case main body 101 and the case cover 102 are made of aluminum alloy or the like by casting. The motor bearing 106b is fitted in the case main body 101 and the motor bearing 106a is fitted in the case cover 102 to rotatably support the motor shaft 105.

The motor stator 103 is fixed on the inner circumferential surface of the case main body 101. The motor stator 103 includes a coil and generates magnetic force when energized.

On the other hand, the motor rotor 104 provided with a permanent magnet is fixed on the motor shaft 105. The motor stator 103 and the motor rotor 104 are spaced at a predetermined distance, providing a gap therebetween. When the motor stator 103 is supplied with current, the motor rotor 104 is rotated, generating drive power to be transmitted to the motor shaft 105.

A resolver stator 40 is fixed to the inside of the case caver 102. While the case main body 101 and the case cover 102 are assembled, a resolver rotor 20 and the resolver stator 40 are placed apart at a predetermined distance. The predetermined distance is preferably as short as possible to enhance the detection accuracy of a resolver 100. However, the distance is determined based on dimensional tolerance, dimensional change caused by temperature, and other conditions.

Figure 15:
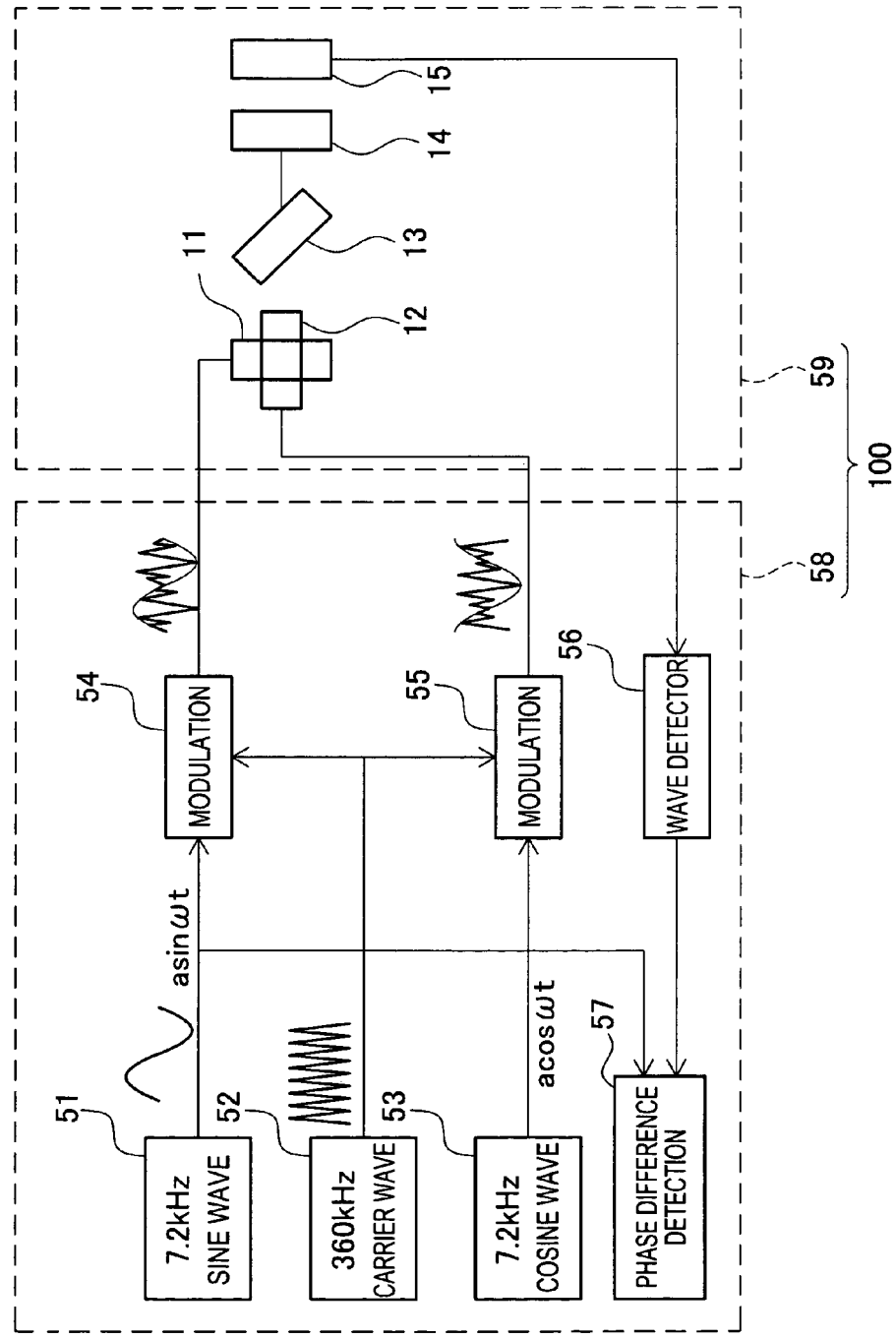
FIG. 15 is a block diagram showing resolver position detecting control.

FIG. 15 is a block diagram showing position detecting control of the resolver. The resolver 100 includes a circuit 58 and a sensor section 59. The circuit 58 includes a SIN signal generator 51, a carrier wave generator 52, a COS signal generator 53, a first modulator 54, a second modulator 55, a wave detector 56, and a phase difference detector 57. The sensor section 59 includes a SIN signal excitation coil 11, a COS signal excitation coil 12, a detection coil 13, a rotor-side rotary transformer 14, and a stator-side rotary transformer 15.

The SIN signal generator 51 for generating a SIN (sine) signal wave of 7.2 kHz is connected to the first modulator 54 as shown in FIG. 15. The COS signal generator 53 for generating a COS (cosine) signal wave of 7.2 kHz is connected to the second modulator 55.

Furthermore, the carrier wave generator 52 for generating a SIN carrier wave of 360 kHz is connected to the first modulator 54 and the second modulator 55 respectively. The SIN signal generator 51 is connected to the phase difference detector 57. The wave detector 56 is connected to the phase difference detector 57.

The first modulator 54 is connected to the SIN signal excitation coil 11 and the second modulator 55 is connected to the COS signal excitation coil 12. The detection coil 13 is connected to the rotor-side rotary transformer 14. The stator-side rotary transformer 15 is connected to the wave detector 56.

The structures of the SIN signal excitation coil 11 and the COS signal excitation coil 12 are explained in detail below.

Figure 1:
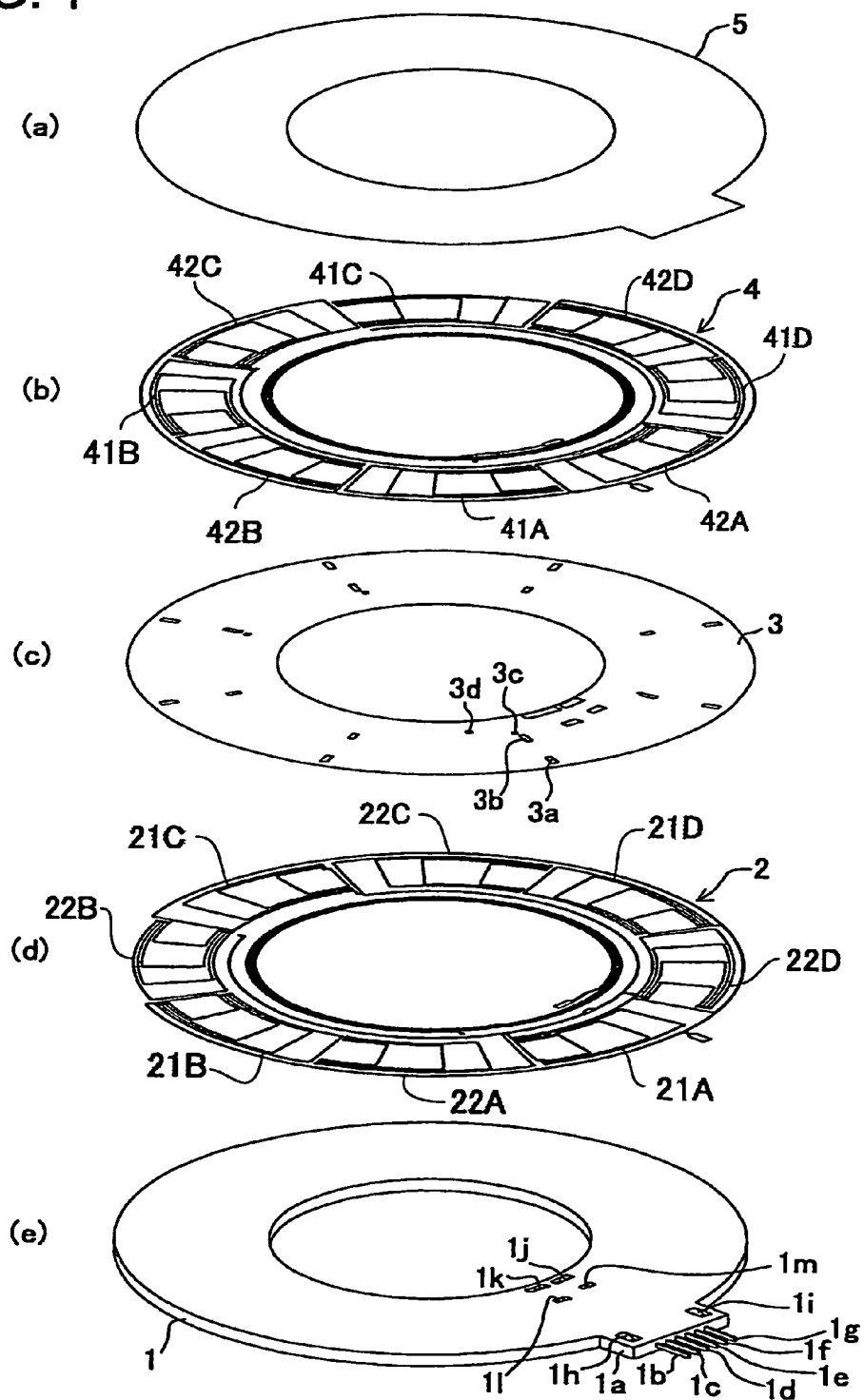
FIG. 1 is an exploded perspective view of a resolver stator in which a SIN signal excitation coil and a COS signal excitation coil are formed on a surface.

FIG. 1 is an exploded perspective view of a main body side resolver, i.e., the resolver stator 40, in which the SIN signal excitation coil 11 and the COS signal excitation coil 12 are formed on a surface. In FIG. 1, (e) shows a resolver body 1 serving as a base plate made of PPS resin and having high planarity; (d) shows a first coil layer 2 formed on the surface of the resolver body 1; (c) shows an interlayer insulating layer 3 for insulating between the first coil layer 2 and the second coil layer 4; (b) shows the second coil layer 4 formed on the interlayer insulating layer 3; and (a) shows an overcoat 5 made of insulating resin to serve as a protective film.

The resolver body 1 has a circular disc shape formed with a central circular hole and with a terminal section 1a protruding from one peripheral portion as shown in (e) of FIG. 1. From the outer periphery of the terminal section 1a, six terminals 1b, 1c, 1d, 1e, 1f, and 1g are arranged in this order from the left side in the figure to protrude outward. On the upper surface of the terminal section 1a, terminal connection parts 1h and 1i are formed. Furthermore, four connection parts 1k, 1j, 1l, and 1m are formed on the surface of the resolver body 1 on its inner circumferential side, opposite the terminal section 1a in the radial direction.

Figure 12:
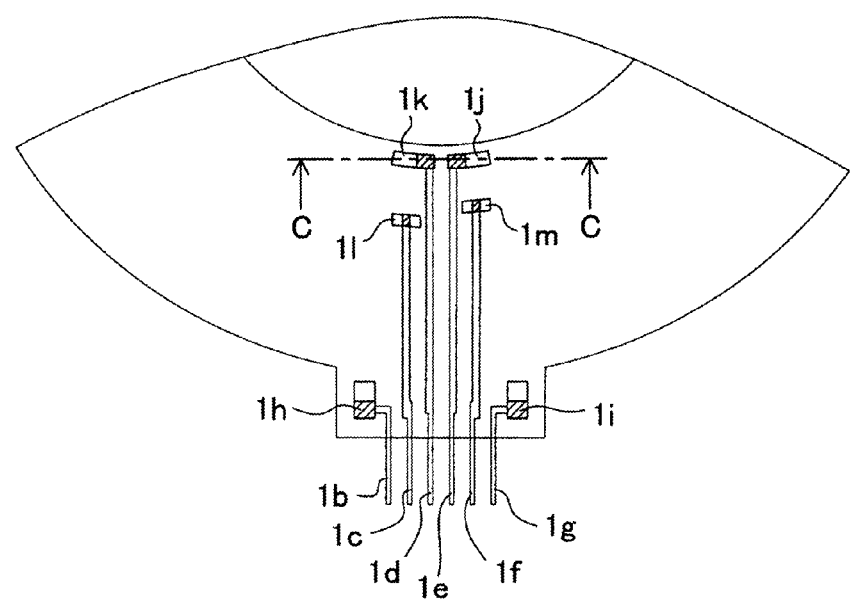
FIG. 12 is a partial cross sectional view of a part including terminals.

FIG. 12 is a partial sectional view of the resolver body 1, including the terminal section 1a provided with the terminals 1b to 1g. As shown in FIG. 12, the terminal 1b is connected to the connection part 1h, the terminal 1c is connected to the connection part 1l, the terminal 1d is connected to the connection part 1k, the terminal 1e is connected to the connection part 1j, the terminal 1f is connected to the connection part 1m, and the terminal 1g is connected to the connection part 1i. This configuration is produced by insert molding those terminals 1b to 1g.

Figure 13:
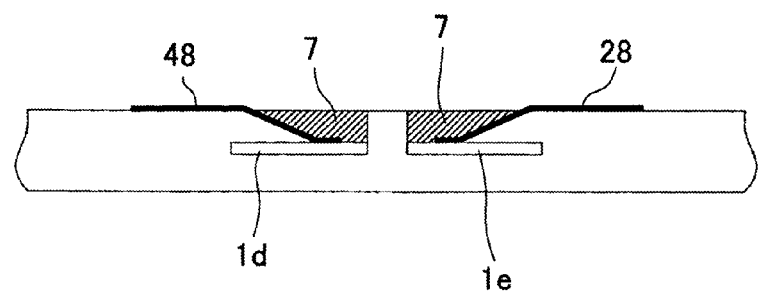
FIG. 13 is a cross sectional view taken along a line C-C in FIG. 12.

FIG. 13 is a sectional view taken along a line C-C in FIG. 12. As shown in FIG. 13, the terminals 1d and 1e are connected to connecting wires 28 and 48 with conductive adhesive 7 via through holes.

Figure 2:
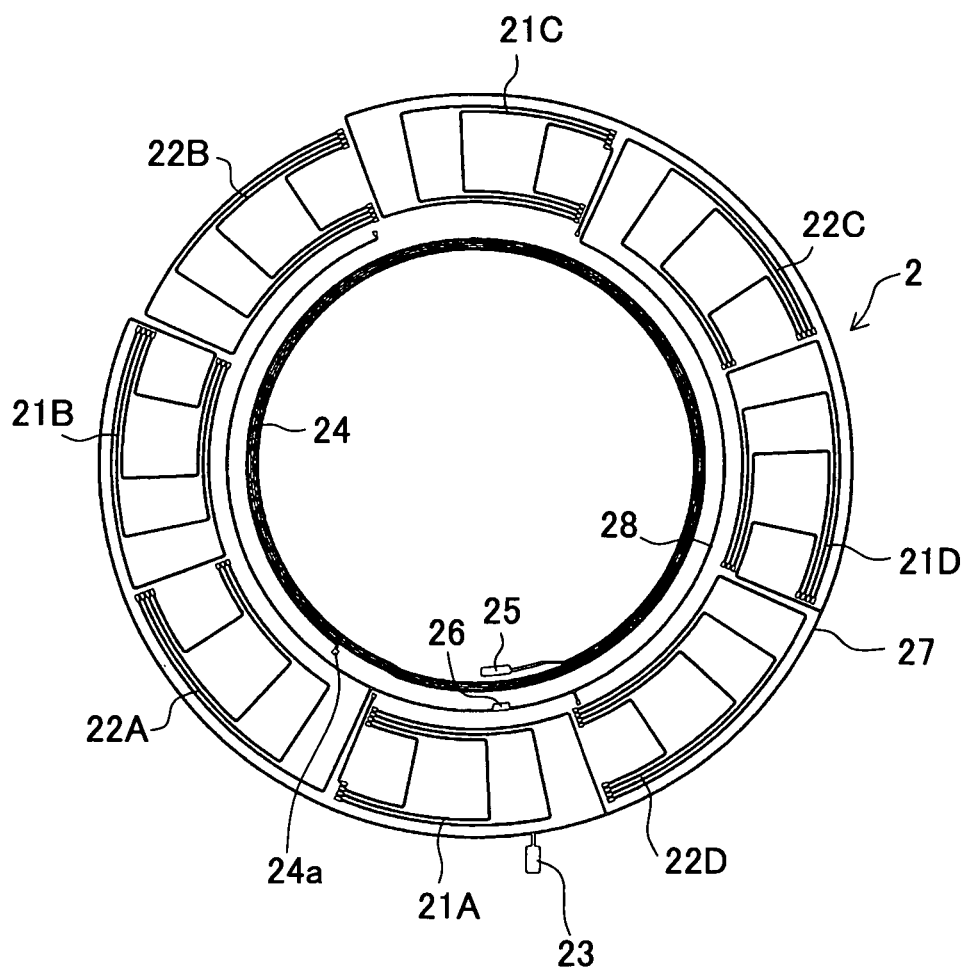
FIG. 2 is a plan view of a first coil layer in (d) of FIG. 1.

FIG. 2 is a plan view of the first coil layer 2 in (d) of FIG. 1. In a position corresponding to the terminal connection part 1i in the terminal section 1a, a terminal connection part 23 is formed as one end of the COS signal excitation coil 12. Near the terminal connection part 23 in FIG. 2, a COS coil part 21A is formed and further a SIN coil part 22A, a COS coil part 21B, a SIN coil part 22B, a COS coil part 21C, a SIN coil part 22C, a COS coil part 21D, and a SIN coil part 22D are arranged clockwise.

Figure 3:
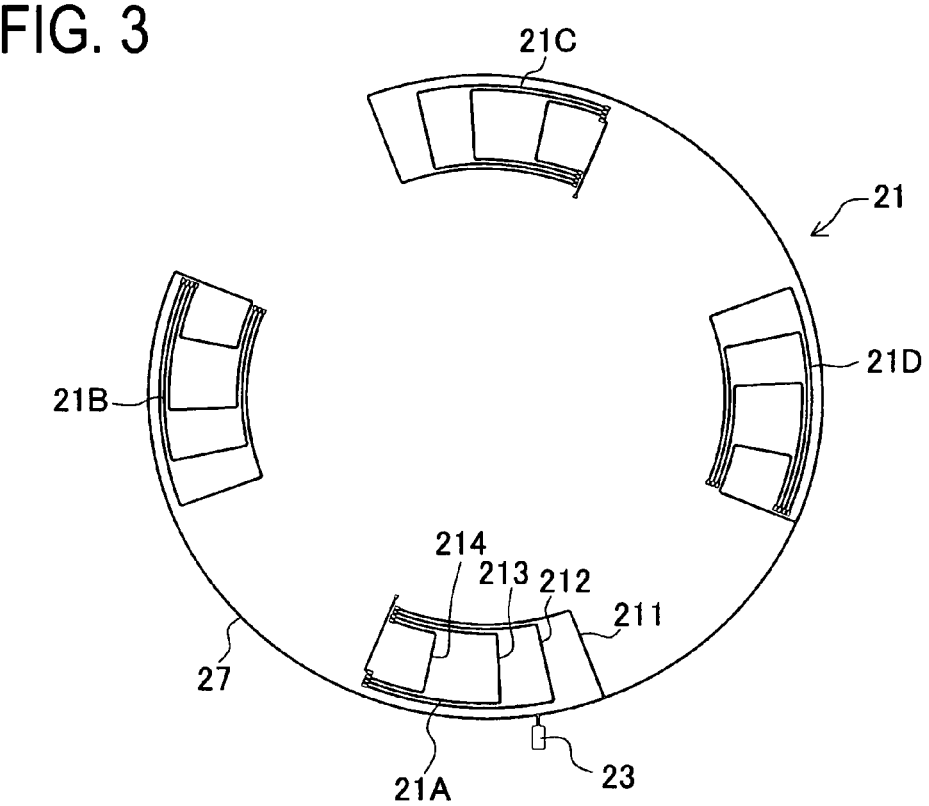
FIG. 3 is a view showing only a COS coil part extracted from FIG. 2.

FIG. 3 shows only a COS coil part 21 (21A to 21D) extracted from FIG. 2. Each of the COS coil parts 21A to 21D is formed in an angular U shape and of four coil wires 211, 212, 213, and 214 extending from outer to inner circumferences at different lengths. Only the outer circumference coil wire 211 is partly shared with a connecting wire 27.

The COS terminal connection part 23 is connected to one ends of the COS coil parts 21A to 21D through the connecting wire 27 placed on the outermost circumferential side.

Figure 4:
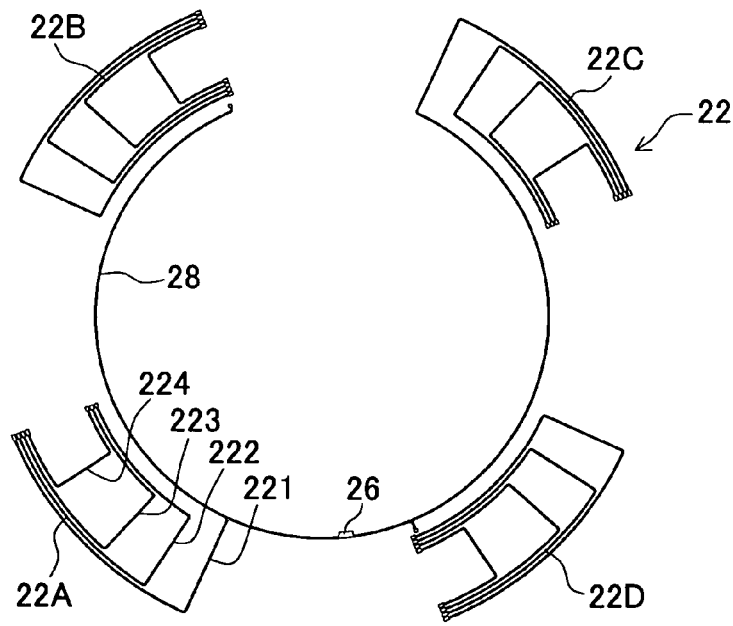
FIG. 4 is a view showing only a SIN coil part extracted from FIG. 2.

FIG. 4 shows only a SIN coil part 22 (22A to 22D) extracted from FIG. 2. Each of the SIN coil parts 22A to 22D is formed in an angular U shape and of four coil wires 221, 222, 223, and 224 extending from outer to inner circumferences at different lengths. Only the outer circumference coil wire 221 is partly shared with a connecting wire 28.

The connecting wire 28 is formed on the inner circumferential side of the COS coil part 21 and the SIN coil part 22. The connecting wire 28 is formed with a SIN terminal connection part 26. This connection part 26 is connected to the terminal connection part 1m in (e) of FIG. 1. The connection part 26 is also connected to one ends of the SIN coil parts 22A, 42C, 22C, and 42A through the connecting wire 28.

As shown in FIG. 2, a rotary transformer coil 24 is circularly formed on the inner circumferential side than the connecting wire 28. The rotary transformer coil 24 is formed with a terminal connection part 25. This connection part 25 is connected to the terminal connection part 1j in (e) of FIG. 1.

Figure 5:
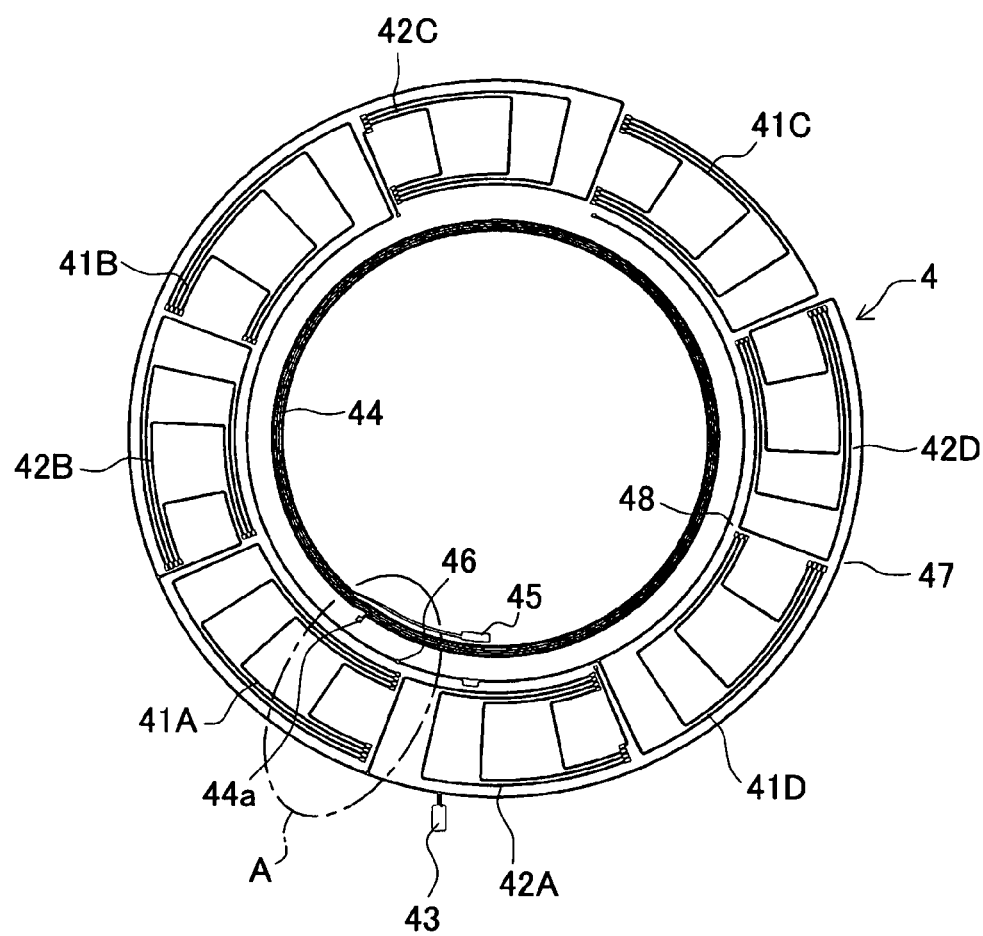
FIG. 5 is a plan view of a second coil layer in (b) of FIG. 1.

The second coil layer 4 is explained below. FIG. 5 is a plan view of the second coil layer 4 in (b) of FIG. 1.

In a position corresponding to the terminal connection part 1h of the terminal section 1a, a SIN terminal connection part 43 is formed as one end of the SIN signal excitation coil 11. Near the terminal connection part 43 in FIG. 5, a SIN coil part 42A is formed and further a COS coil part 41A, a SIN coil part 42B, a COS coil part 41B, a SIN coil part 42C, a COS coil part 41C, a SIN coil part 42D, and a COS coil part 41D are arranged clockwise.

Figure 7:
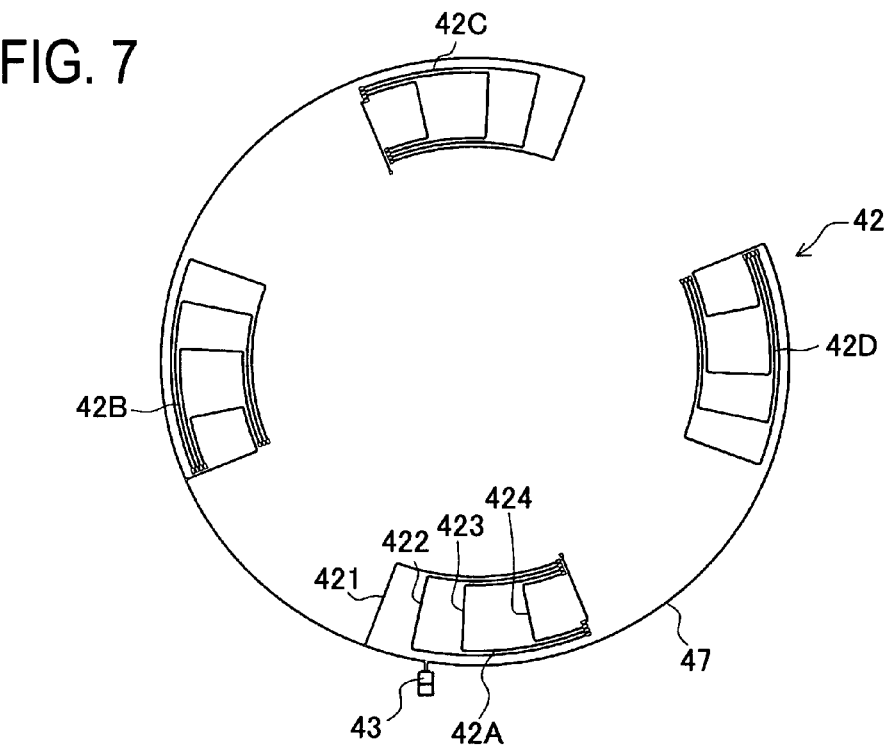
FIG. 7 is a view showing only a SIN coil part extracted from FIG. 5.

FIG. 7 shows only a SIN coil part 42 (42A to 42D) extracted from FIG. 5. Each of the SIN coil parts 42A to 42D is formed in an angular U shape and of four coil wires 421, 422, 423, and 424 extending from outer to inner circumferences at different lengths. The outer circumference coil wire 421 is partly shared with a connecting wire 47.

The SIN terminal connection part 43 is connected to one ends of the SIN coil parts 42A to 42D through the connecting wire 47 formed on the outermost circumferential side.

Figure 8:
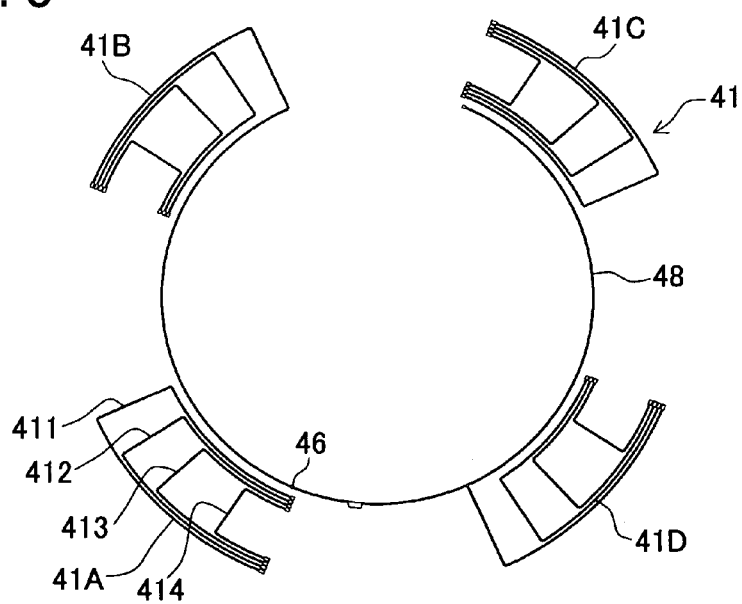
FIG. 8 is a view showing only a COS coil part extracted from FIG. 5.

FIG. 8 shows only a COS coil part 41 (41A to 41D) extracted from FIG. 5. Each of the COS coil parts 41A to 41D is formed in an angular U shape and of four coil wires 411, 412, 413, and 414 extending from outer to inner circumferences at different lengths. The outer circumference coil wire 411 is partly shared with a connecting wire 48.

The connecting wire 48 is formed on the inner circumferential side of the COS coil part 41 and the SIN coil part 42. The connecting wire 48 is formed with a COS terminal connection part 46. This connection part 46 is connected to the terminal connection part 1l in (e) of FIG. 1. The connection part 46 is also connected to one ends of the COS coil parts 21A, 41B, 21C, and 41D through the connecting wire 48.

As shown in FIG. 5, the rotary transformer coil 44 is circularly formed on the inner circumferential side than the connecting wire 48. The rotary transformer coil 44 is formed with a terminal connection part 45. This connection part 45 is connected to the terminal connection part 1k in (e) of FIG. 1.

Figure 6:
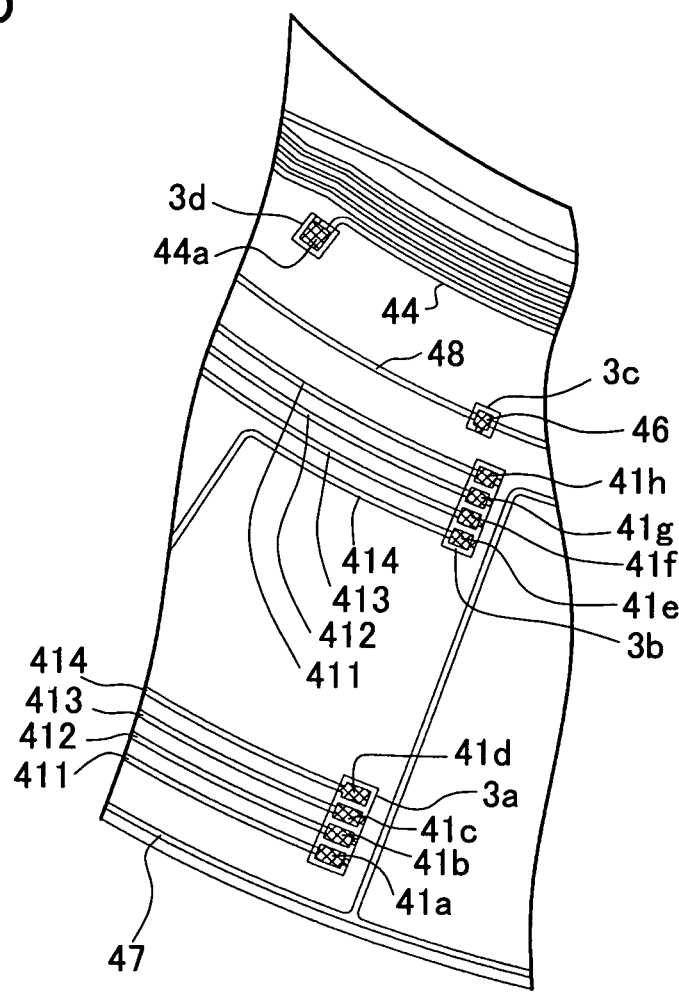
FIG. 6 is an enlarged view of a part A in FIG. 5.
Figure 9:
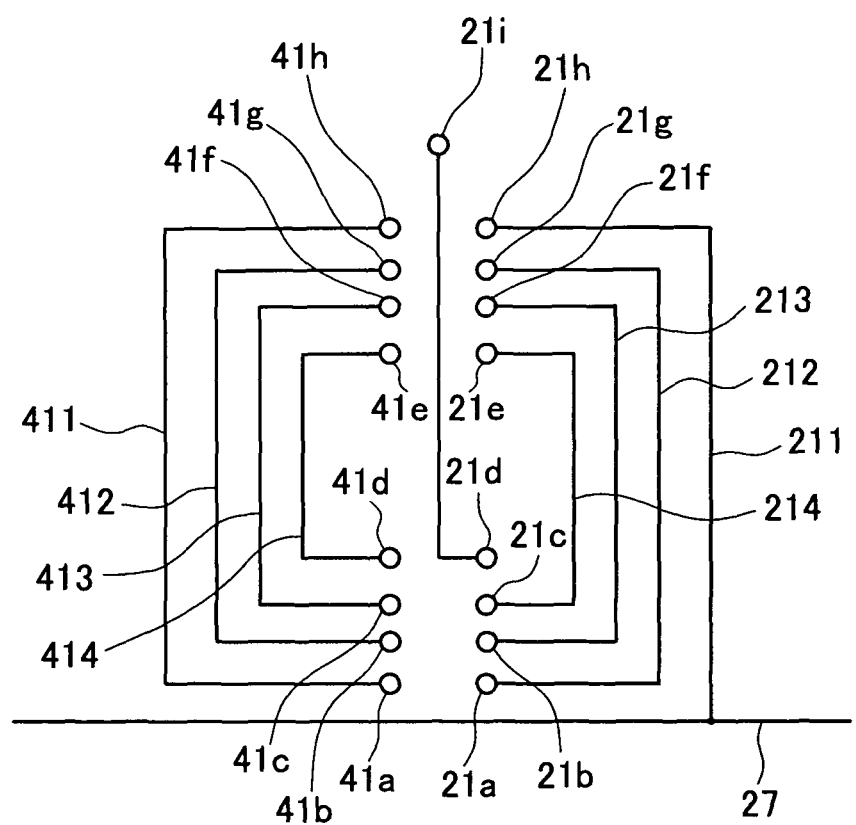
FIG. 9 is a view schematically showing connection between COS coil parts.
Figure 10:
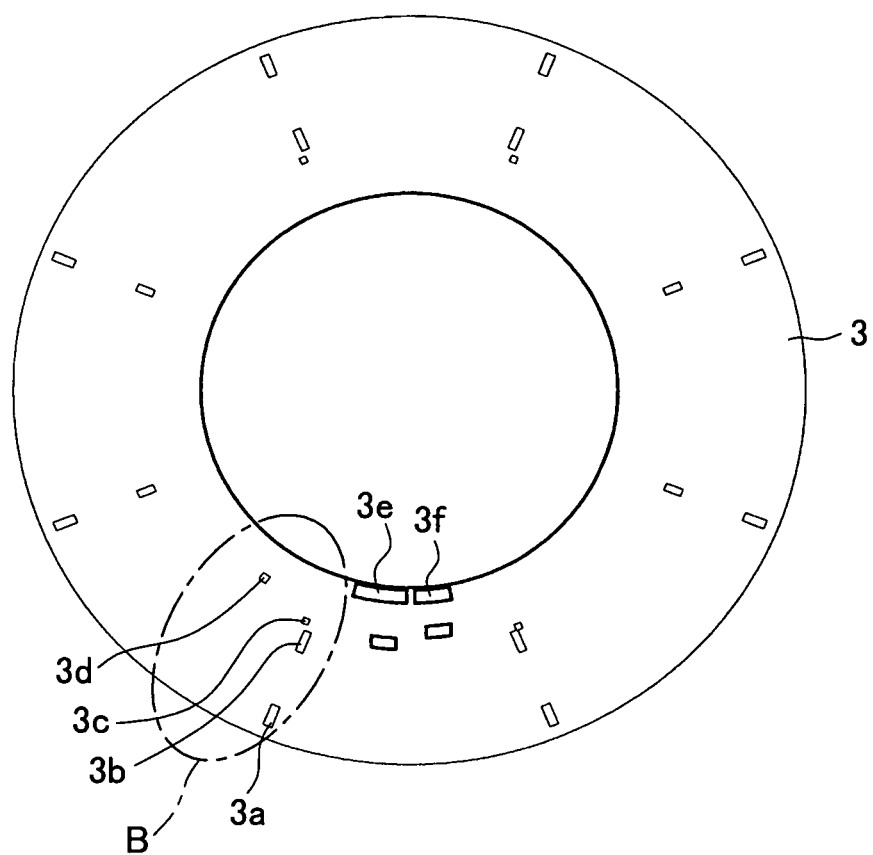
FIG. 10 is a plan view of an interlayer insulating layer.
Figure 11:
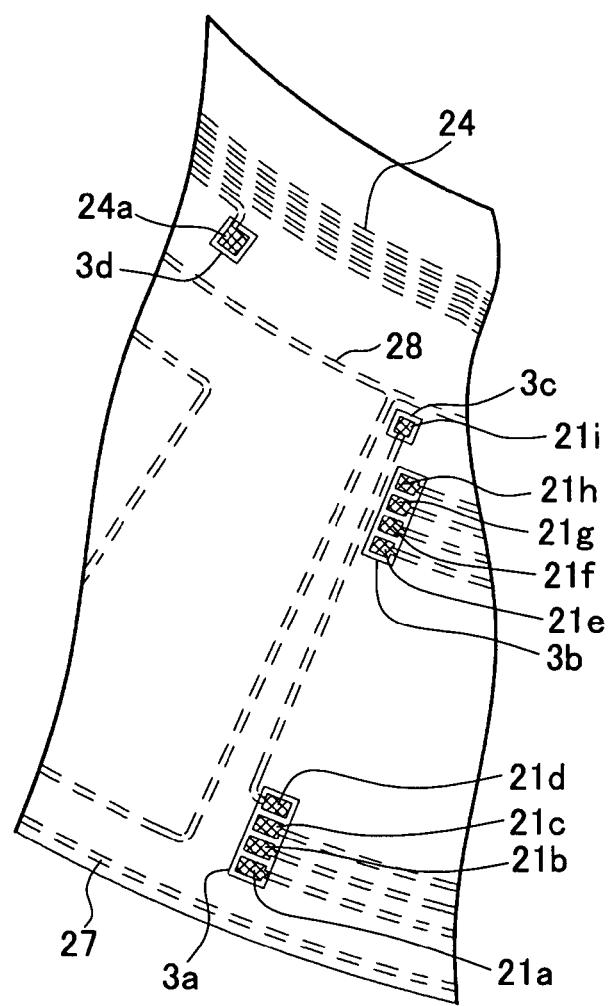
FIG. 11 is an enlarged view of a part B in FIG. 10.

FIG. 6 is an enlarged view of a part A in FIG. 5. FIG. 9 schematically shows connection between the COS coil part 21A and the COS coil part 41A. FIG. 10 is a plan view of the interlayer insulating layer 3. FIG. 11 is an enlarged view of a part B in FIG. 10. In FIG. 11, wiring of the first coil layer 2 is indicated by broken lines.

In FIG. 9, the COS coil part 41A formed in the second coil layer 4 includes four COS coil wires 411, 412, 413, and 414, each having an angular U shape, arranged in this order from outside, and eight terminal parts 41a, 41b, 41c, 41d, 41e, 41f, 41g, and 41h arranged in this order from below.

On the other hand, the COS coil part 21A formed in the first coil layer 2 includes four COS coil wires 211, 212, 213, and 214, each having an angular U shape, arranged in this order from outside, and eight terminal parts 21a, 21b, 21c, 21d, 21e, 21f, 21g, and 21h arranged in this order from below.

The connecting wire 27 is connected to the connection part 21h through the COS coil wire 211. The connection part 21h is connected to the connection part 41h through a through hole 3b. The connection part 41h is connected to the connection part 41a through the COS connecting wire 411.

The connection part 41a is connected to the connection part 21a through a through hole 3a. The connection part 21a is connected to the connection part 21g through the COS connecting wire 212. The connection part 21g is connected to the connection part 41g through the through hole 3b. The connection part 41g is connected to the connection part 41b through the COS connecting wire 412.

The connection part 41b is connected to the connection part 21b through the through hole 3a. The connection part 21b is connected to the connection part 21f through the COS connecting wire 213. The connection part 21f is connected to the connection part 41f through the through hole 3b. The connection part 41f is connected to the connection part 41c through the COS connecting wire 413.

The connection part 41c is connected to the connection part 21c through the through hole 3a. The connection part 21c is connected to the connection part 21e through the COS connecting wire 214. The connection part 21e is connected to the connection part 41e through the through hole 3b. The connection part 41e is connected to the connection part 41d through the COS connecting wire 414.

The connection part 41d is connected to the connection part 21d through the through hole 3a. The connection part 21d is connected to the terminal part 21i placed outside the coil part. This terminal part 21i is connected to the terminal part 46 shown in FIG. 6 through a through hole 3c.

The above connection allows a COS current for excitation in FIG. 2 to flow from the connecting wire 27 to the terminal part 21h via the COS coil wire 211 formed in the first coil layer 2, and then flow from the terminal part 41h through the through hole 3b to the terminal part 41a through the COS coil wire 411 formed in the second coil layer 4. The current then flows to the subsequent terminal parts and coil wires; 21a, 212, 21g, 41g, 412, 41b, 21b, 213, 21f, 41f, 413, 41c, 21c, 214, 21e, 41e, 414, 41d, 21d, and 21i in sequence. In other words, the COS current for excitation flows counterclockwise in a spiral manner from the outer to the inner circumferential sides. Meanwhile, the current alternately flows to the COS coil part 21A formed in the first coil layer 2 and the COS coil part 41A formed in the second coil layer 4. Accordingly, the COS current for excitation is allowed to flow counterclockwise, thereby generating regular magnetic flux.

Connection wiring of other combinations of the COS coil parts 21B and 41B, 21C and 41C, and 21D and 41D is also the same as above. Specifically, the coil parts 21B and 41B form one circumferential coil, the coil parts 21C and 41C form another circumferential coil, and the coil parts 21D and 41D form another circumferential coil.

Connection wiring of combinations of the SIN coil parts 22A and 42B, 22B and 42C, 22C and 42D, and 22D and 42A is also the same as above. The details thereof will not be explained here. Similarly, the coil parts 22A and 42B form one circumferential coil, the coil parts 22B and 42C form another circumferential coil, the coil parts 22C and 42D form another circumferential coil, and the coil parts 22D and 42A form another circumferential coil.

Wiring of the rotary transformer coil is explained below. The terminal part 1j for rotary transformer coil formed in the resolver body 1 in FIG. 1 is connected to the terminal part 25 formed at one end of the rotary transformer coil 24 formed in the first coil layer 2 in FIG. 2. A terminal part 24a formed at the other end of the rotary transformer coil 24 is connected, through a through hole 3d, to a terminal part 44a formed at one end of the rotary transformer coil 44 formed in the second coil layer 4 in FIG. 5. A terminal part 45 formed at the other end of the rotary transformer coil 44 is connected to the terminal part 1k in (e) of FIG. 1 through a through hole 3e.

Figure 14:
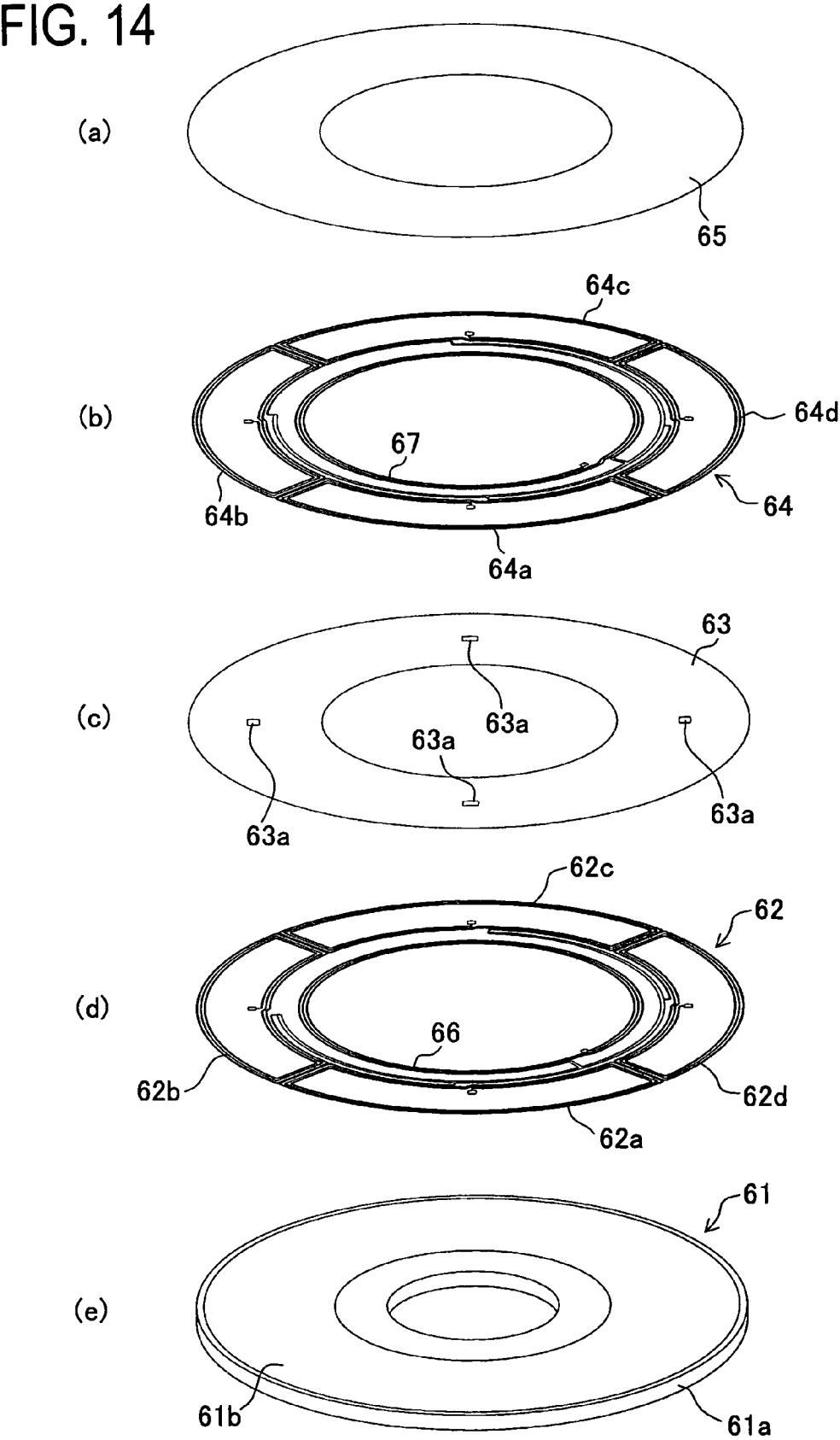
FIG. 14 is an exploded perspective view showing a configuration of a resolver rotor.

The resolver rotor formed with the detection coil 13 is explained below. FIG. 14 is an exploded perspective view showing the structure of the resolver rotor 20. In FIG. 14, (e) shows a body 61 of the resolver rotor 20; (d) shows a first coil layer 62 formed on a surface of the resolver rotor 61; (c) shows an interlayer insulating layer 63 for insulating between the first coil layer 62 and the second coil layer 64; (b) shows the second coil layer 64 formed on the interlayer insulating layer 63; and (a) shows an overcoat 65 made of insulating resin to serve as a protecting film.

The body 61 has a circular disc shape formed with a central circular hole as shown in (e) of FIG. 14. This body 61 is constituted of a plate 61a made of a non-electromagnetic conductive metal such as aluminum and brass, and formed with a recess filled with solidified resin such as PPS.

The first coil layer 62 includes four detection coils 62a, 62b, 62c, and 62d. The second coil layer 64 similarly includes four detection coils 64a, 64b, 64c, and 64d. One ends of the detection coils 62a to 62d are connected to one end of a rotary transformer 66. The other ends of the detection coils 62a to 62d are connected to one ends of the four detection coils 64a to 64d of the second coil layer 64 through holes 63a. The other ends of the detection coils 64a to 64d are connected to one end of a rotary transformer 67. The other end of the rotary transformer 66 and the other end of the rotary transformer 67 are connected to each other through a through hole. Accordingly, the detection coils 62 and 64 generate induction current in response to the magnetic flux generated in the excitation coil and then the current is allowed to flow in the rotary transformers 66 and 67.

The magnetic flux generated by this induction current causes induction current to be generated in the rotary transformers 24 and 44 on the resolver body 1 side. This induction current is analyzed to calculate the rotation position of the resolver rotor 20.

In the present embodiment, the rotary transformer 66 is formed in the first coil layer 62 and the rotary transformer 67 is formed in the second coil layer 64. This makes it possible to reduce an occupied area of a rotary transformer in one coil layer, thereby achieving reduced outer dimension of the resolver.

As explained in detail above, the resolver of the present embodiment includes the first coil layer 2 and the second coil layer 4, each of which is formed as a thin film on the resolver body 1 which is a flat plate, and the insulating layer 3 formed between the first and second coil layers 2 and 4. The SIN signal excitation coil 11 includes the SIN first excitation coil 22 formed in the first coil layer 2 and the SIN second excitation coil 42 formed in the second coil layer 4. The COS signal excitation coil 12 includes the COS first excitation coil 21 formed in the first coil layer 2 and the COS second excitation coil 41 formed in the second coil layer 4. Even when the gap between the excitation coil and the detection coil changes, the positional relationship between the SIN signal excitation coil 11 (coils 22 and 42) and the COS signal excitation coil 12 (coils 21 and 41) serving as the excitation coils is always maintained to be constant with respective to the detection coil 13 (coils 62 and 64). Thus, no detection error will occur.

Furthermore, the SIN first excitation coil 22 and the COS second excitation coil 41 are placed in the same position in the circumferential direction of respective coil layers. The SIN second excitation coil 42 and the COS first excitation coil 21 are placed in the same position in the circumferential direction of respective coil layers. Thus, the positional relationship between the SIN signal excitation coil 11 (coils 22 and 42) and the COS signal excitation coil 12 (coils 21 and 41) can be easily and reliably maintained to be constant with respective to the detection coil 13 (coils 62 and 64).

The SIN first excitation coil 22 and the SIN second excitation coil 42 are connected to each other through the through holes formed in the insulating layer 3. The COS first excitation coil 21 and the COS second excitation coil 41 are connected to each other through the through holes 3a and 3b formed in the insulating layer 3. Accordingly, a circumferential coil can be easily produced.

Moreover, the first coil layer 2 and the second coil layer 4 are drawn by printing with conductive ink (for instance, by spray coating using an ink jet printer) and then burned. Even when the resistance of each of the first coil layer 2 and the second coil layer 4 varies due to burning, resistance values of the SIN signal excitation coil 11 (coils 22 and 42) and the COS signal excitation coil 12 (coils 21 and 41) are averaged, respectively. Thus, the detection accuracy is less deteriorated.

The present invention is explained above along the embodiment but not limited thereto. The present invention may furthermore be embodied in other specific forms without departing from the essential characteristics thereof.

For instance, the above embodiment exemplifies the two-phase excitation one-phase search coil resolver including a SIN coil and a COS coil. The present invention may also be applied to another configuration employing a SIN coil and a COS coil as a search coil.

In the above embodiment, the conductive ink is applied by printing (e.g., in an ink jet manner). As an alternative, a sheet coil may be adopted.

In the above embodiment, for example, each of the SIN signal excitation coil 11 and the COS signal excitation coil 12 includes four circumferential coils. For example, one circumferential coil is constituted of the COS first excitation coil 21 formed in the first coil layer 2 and the COS second excitation coil 41 formed in the second coil layer 4. An alternative is to provide two of the four circumferential coils in the first coil layer 2 and the other two in the second coil layer 4.

While the presently preferred embodiment of the present invention has been shown and described, it is to be understood that this disclosure is for the purpose of illustration and that various changes and modifications may be made without departing from the scope of the invention as set forth in the appended claims.

REFERENCE SIGNS LIST

2 First coil layer
3 Interlayer insulating layer
4 Second coil layer
11 SIN signal excitation coil
12 COS signal excitation coil
13 Detection coil
21 COS first excitation coil
22 SIN first excitation coil
41 COS second excitation coil
42 SIN second excitation coil

The invention claimed is:
1. A resolver having a SIN coil and a COS coil each formed on a flat plate, comprising:
 a first coil layer and a second coil layer each formed on the flat plate; and an insulating layer formed between the first coil layer and the second coil layer, wherein the SIN coil includes a plurality of SIN planar spiral coils, each including a SIN first coil part formed in the first coil layer and a SIN second coil part formed in the second coil layer, and the COS coil includes a plurality of COS planar spiral coils, each including a COS first coil part formed in the first coil layer and a COS second coil part formed in the second coil layer.

2. The resolver according to claim 1, wherein the SIN first coil part and the COS second coil part are placed in the same position in a circumferential direction of the first and second coil layers, and the SIN second coil part and the COS first coil part are placed in the same position in the circumferential direction of the first and second coil layers.

3. The resolver according to claim 2, wherein the SIN first coil part and the SIN second coil part are connected to each other through a through hole formed in the insulating layer, and the COS first coil part and the COS second coil part are connected to each other through a through hole formed in the insulating layer.

4. The resolver according to claim 2, wherein the first coil layer and the second coil layer are formed in such a manner that each coil layer is drawn with conductive ink by printing and then burned.

5. The resolver according to claim 2, wherein the SIN coil and the COS coil are excitation coils.

6. The resolver according to claim 1, wherein the SIN first coil part and the SIN second coil part are connected to each other through a through hole formed in the insulating layer, and the COS first coil part and the COS second coil part are connected to each other through the through hole formed in the insulating layer.

7. The resolver according to claim 1, wherein the first coil layer and the second coil layer are formed in such a manner that each coil layer is drawn with conductive ink by printing and then burned.

8. The resolver according to claim 1, wherein the SIN coil and the COS coil are excitation coils.

* * * * *